US012583538B2

(12) United States Patent
Bates, Jr. et al.

(10) Patent No.: US 12,583,538 B2
(45) Date of Patent: *Mar. 24, 2026

(54) TRACKED VEHICLE

(71) Applicant: Polaris Industries Inc., Medina, MN (US)

(72) Inventors: Richard H. Bates, Jr., Badger, MN (US); Jonathon R. Eaton, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 963 days.

This patent is subject to a terminal disclaimer.

(21) Appl. No.: 17/564,672

(22) Filed: Dec. 29, 2021

(65) Prior Publication Data

US 2022/0119049 A1 Apr. 21, 2022

Related U.S. Application Data

(63) Continuation of application No. 16/059,789, filed on Aug. 9, 2018, now Pat. No. 11,214,320.

(51) Int. Cl.
| | |
|---|---|
| B62D 55/07 | (2006.01) |
| B62D 55/108 | (2006.01) |
| B62M 27/02 | (2006.01) |

(52) U.S. Cl.
CPC ........... B62D 55/108 (2013.01); B62D 55/07 (2013.01); B62M 27/02 (2013.01); *B62M 2027/026* (2013.01); *B62M 2027/028* (2013.01)

(58) Field of Classification Search
CPC ...... B62D 55/108; B62D 55/07; B62M 27/02; B62M 2027/026; B62M 2027/028; B62M 2027/023; B62M 2027/021

USPC ................................................ 180/68.4, 68.6
See application file for complete search history.

(56) References Cited

U.S. PATENT DOCUMENTS

| | | | |
|---|---|---|---|
| 5,370,198 | A | 12/1994 | Karpik |
| 5,667,031 | A | 9/1997 | Karpik |
| 5,881,834 | A | 3/1999 | Karpik |
| 6,595,309 | B1 | 7/2003 | Savage et al. |
| 8,151,923 | B1 | 4/2012 | Giese |
| 8,381,857 | B1 | 2/2013 | Sampson et al. |
| 8,676,440 | B2 | 3/2014 | Watson |
| 9,944,352 | B2 | 4/2018 | Hawksworth et al. |
| 10,077,088 | B1 | 9/2018 | Forbes |
| 11,214,320 | B2 * | 1/2022 | Bates, Jr. ............... B62D 55/07 |
| 11,890,911 | B2 * | 2/2024 | Gagnon ................ B62D 55/07 |
| 2001/0015297 | A1 | 8/2001 | Harle et al. |
| 2002/0033290 | A1 | 3/2002 | Vaisanen |

(Continued)

FOREIGN PATENT DOCUMENTS

| | | | |
|---|---|---|---|
| CA | 2539743 A1 | 7/2006 | |
| JP | 10212947 A | * | 8/1998 |

OTHER PUBLICATIONS

Polaris Industries Inc., 1997 Polaris 500 Indy Snowmobile Service Manual, Polaris Xtra 12 Suspension, 16 pages.

(Continued)

*Primary Examiner* — Anne Marie M Boehler
(74) *Attorney, Agent, or Firm* — Merchant & Gould P.C.

(57) ABSTRACT

A snowmobile assembly including a chassis and suspension system. The suspension system configured to allow a selected suspension travel. The snowmobile further including a cooling system assembly.

8 Claims, 12 Drawing Sheets

(56)                    References Cited

U.S. PATENT DOCUMENTS

| | | |
|---|---|---|
| 2003/0034191 A1 | 2/2003 | Karpik |
| 2004/0159483 A1 | 8/2004 | Imamura et al. |
| 2004/0173390 A1* | 9/2004 | Karpik ................. B62D 55/108 |
| | | 180/9.54 |
| 2004/0195023 A1 | 10/2004 | Yoshihara |
| 2006/0169510 A1 | 8/2006 | Visscher |
| 2007/0199753 A1 | 8/2007 | Giese et al. |
| 2007/0221424 A1 | 9/2007 | Giese |
| 2007/0246283 A1 | 10/2007 | Giese et al. |
| 2011/0120793 A1 | 5/2011 | Lucarelli |
| 2011/0240398 A1 | 10/2011 | Vezina |
| 2012/0193158 A1 | 8/2012 | Giese |
| 2013/0032420 A1 | 2/2013 | Mills et al. |
| 2016/0016639 A1 | 1/2016 | Pard |
| 2016/0152304 A1 | 6/2016 | Vezina et al. |
| 2017/0158046 A1 | 6/2017 | Vezina et al. |
| 2018/0251168 A1 | 9/2018 | Mangum et al. |

OTHER PUBLICATIONS

Office Action issued in Canadian Application No. 3051183, mailed Jan. 26, 2021.

Office Action issued in corresponding Canadian Application No. 3051183 mailed Jun. 22, 2021.

* cited by examiner

TRACKED VEHICLE

CROSS-REFERENCE TO RELATED APPLICATIONS

This application is continuation of U.S. patent application Ser. No. 16/059,789 filed on Aug. 9, 2018. The entire disclosure of the above application is incorporated herein by reference.

FIELD

The subject disclosure relates to a vehicle, in particular to a suspension and chassis assembly for the vehicle.

BACKGROUND

A vehicle, such as a snowmobile, generally includes a chassis and an engine assembly. The engine assembly is operated with the use of fuel to generate power to drive the vehicle. The engine generally powers a track or tread. The track travels on rollers that are connected or suspended with a suspension from a chassis. A seat for a rider is mounted to the chassis and the suspension assists in reducing shock to the rider and/or maintaining the track in contact with a surface.

SUMMARY

A chassis or a snowmobile generally includes a tunnel portion that extends rearward from a seat portion of the snowmobile. The tunnel may include a radiator for assisting in dissipating heat generated by an engine of the snowmobile. The further the tunnel may cover or include a chassis portion to which suspension components are connected. The suspension components assist to reduce shock to a rider during operation of the snowmobile and/or maintain contact with a surface by a tread of the snowmobile.

The snowmobile may include various features, such as a long travel suspension system. The long travel suspension system may include a selected geometry of one or more torque or torsion arms relative to the chassis assembly and/or a portion of a suspension assembly. Generally the suspension assembly may include various parts such as one or more springs, one or more shock absorbers, one or more torque or torsion arms, and one or more linkages interconnecting a portion of the suspension assembly, such as a slide or skid plate, and a top member or portion of a tunnel and/or side walls of the chassis assembly. The interconnection, geometry, and lengths of various portions allow for a selected travel of the suspension while maintaining the track of the snowmobile in a selected configuration. The suspension travel may allow for a substantially shock free or reduced shock ride for a rider and maintaining contact of the track with a surface, such as a snow or ground surface.

Further, the snowmobile may include an engine that generates heat. In various embodiments, maintaining a selected temperature of the engine may be selected which may be lower than an uncooled temperature of the engine. Cooling the engine may include a liquid cooled engine where a fluid or liquid is passed through the engine and a radiator. The radiator may be positioned relative to the chassis assembly. The chassis assembly may include a tunnel cover member that includes a plurality of through passages or through bores adjacent or near the radiator assembly. In addition, one or more scoops may be positioned near the through bores or through passages to assist in maintaining and/or directing a flow relative to the radiator. For example, the scoops and through passages may assist in directing a flow of liquid, such as melted snow and/or unmelted snow, relative to the radiator, such as for direct contact with the radiator assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
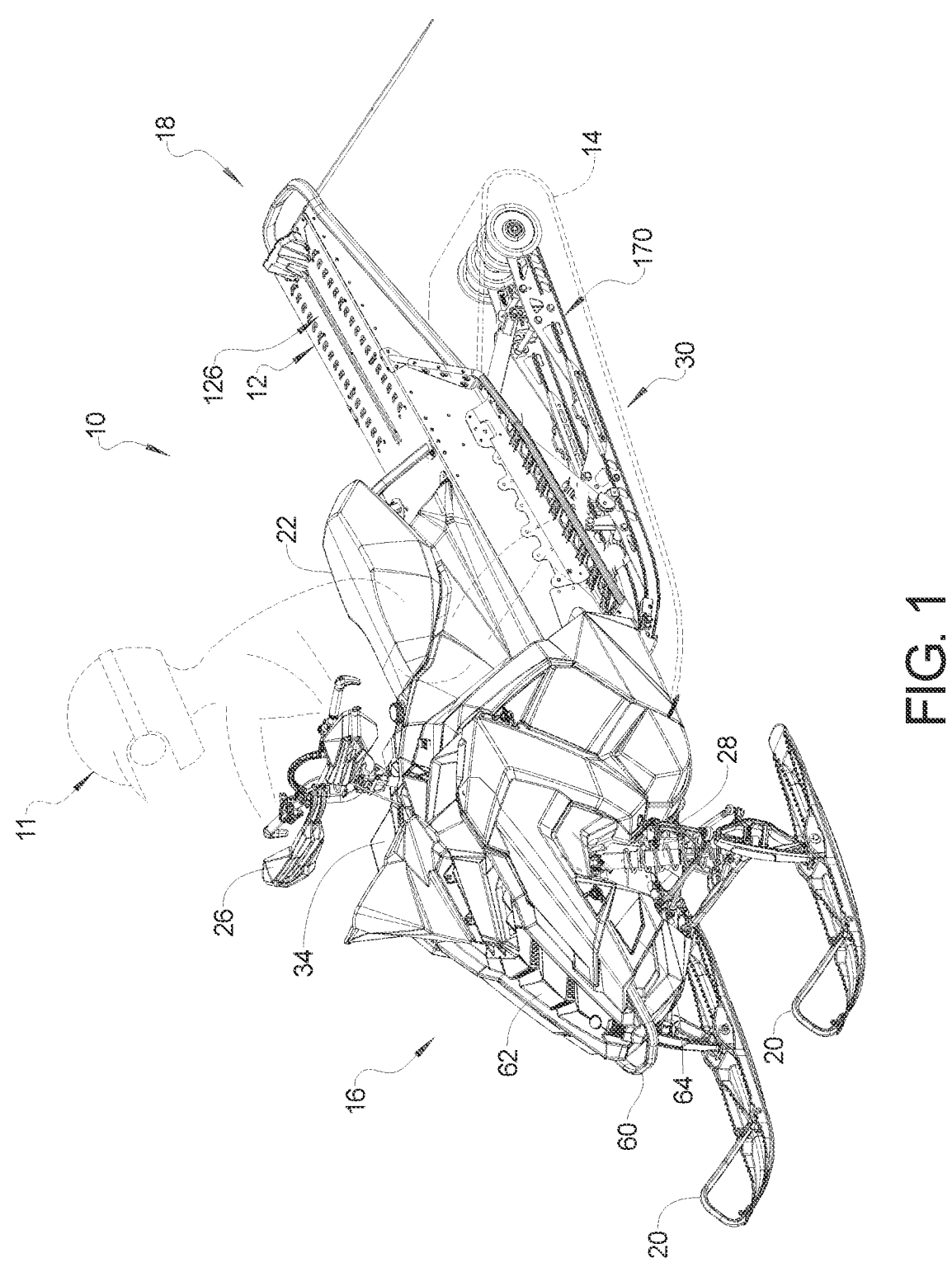
FIG. 1 is a perspective view of a snowmobile.
Figure 2:
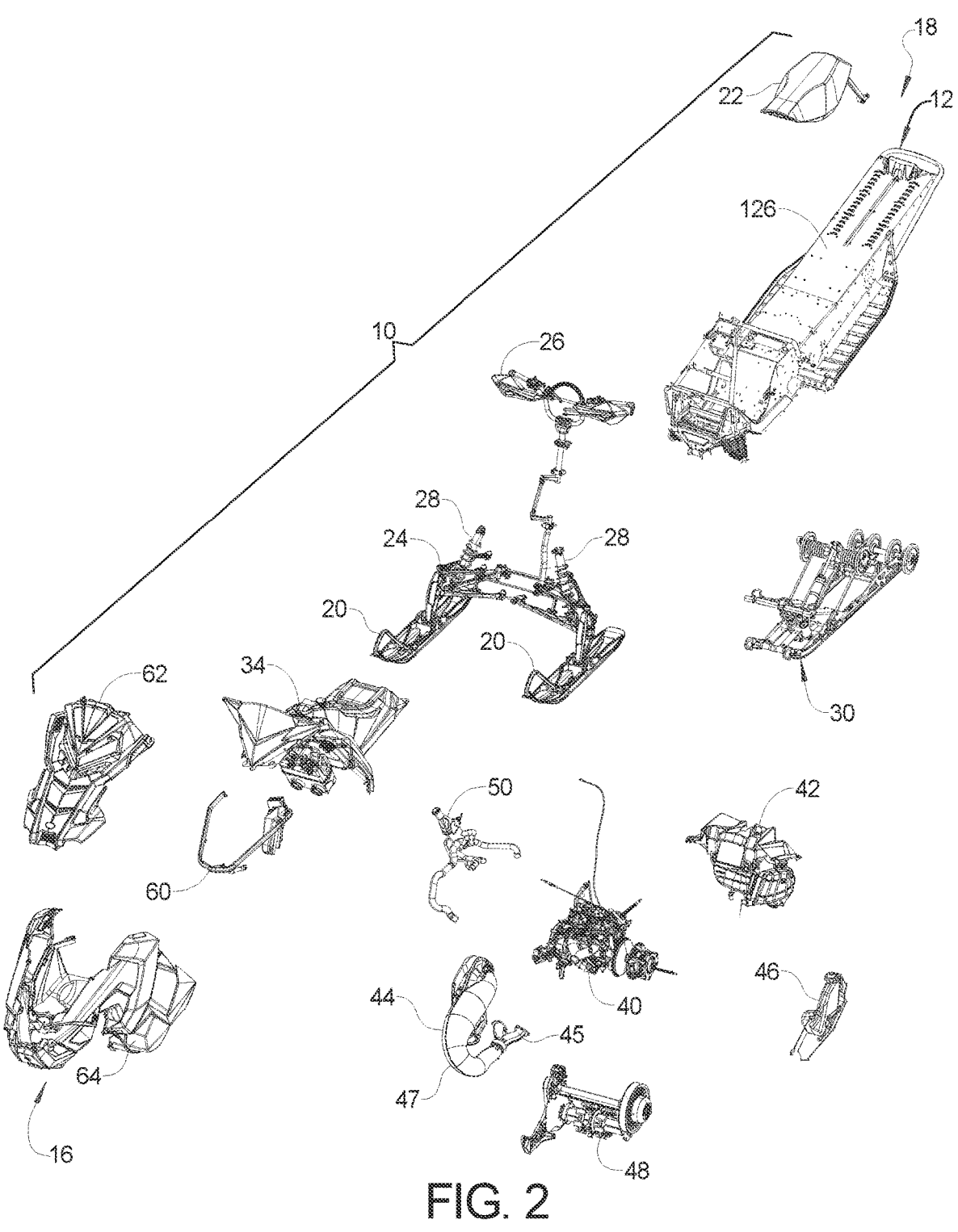
FIG. 2 is an exploded view of the snowmobile of FIG. 1.
Figure 2A:
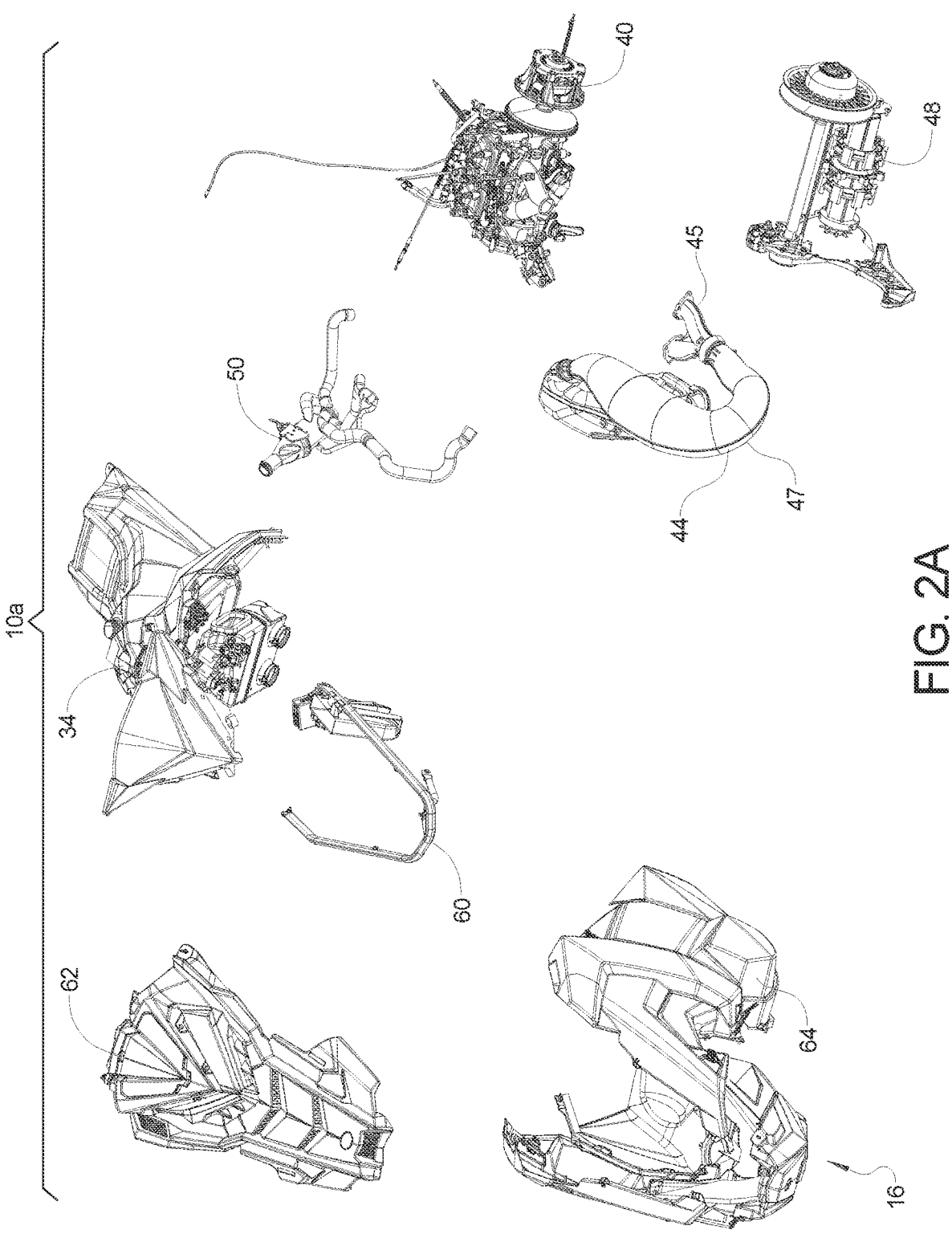
FIGS. 2A and 2B are enlarged exploded views of FIG. 2.
Figure 2B:
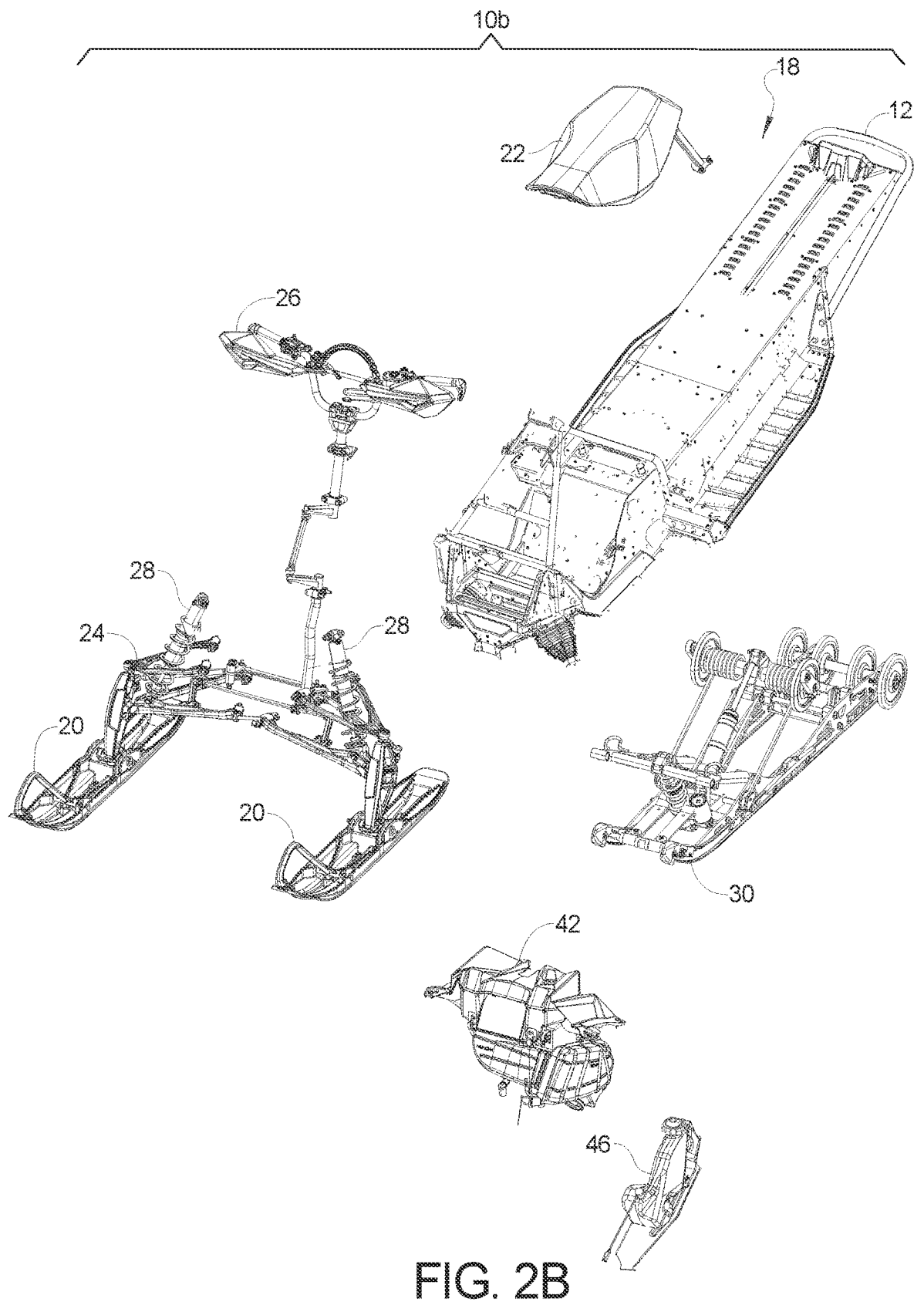

Referring now to FIGS. 1, 2, 2A, and 2B, an exemplary embodiment of an exemplary snowmobile 10 is shown one which a rider 11 may ride and control the snowmobile 10. Snowmobile 10 includes a chassis 12, a track or an endless belt assembly 14, and a pair of front skis 20. Snowmobile 10 also includes a front-end 16 and a rear-end 18. A detail exploded view is illustrated in FIG. 2A and FIG. 2B wherein the exemplary snowmobile 10 is illustrated as separate snowmobile sub-portions 10*a* and 10*b*.

The snowmobile 10 also includes a seat assembly 22 that is coupled to the chassis assembly 12 and on which the rider 11 may sit. A front suspension assembly 24 is also coupled to the chassis assembly 12. The front suspension assembly 24 may include handlebars 26 for steering, shock absorbers 28, and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40, which may be an engine of a selected type such as a two-stroke engine or a four-stroke engine, and may include the engine disclosed in U.S. patent application Ser. No. 15/723,927, filed Oct. 3, 2017, incorporated herein by reference. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44 that includes an exhaust manifold 45 and an exhaust pipe 47. An oil tank assembly 46 is used for providing oil to the engine for lubrication and for mixing with the fuel in the intake assembly 42. A drivetrain assembly 48 is used for converting the rotating crankshaft assembly from the engine assembly 40 into a potential force to use the endless belt 14 and thus the snowmobile 10. The engine assembly 40 is also coupled to a cooling or radiator assembly 50 that is further connected to radiator lines or tubes 168 (FIG. 5), as discussed herein.

The chassis assembly 12 may also include a bumper assembly 60, a hood assembly 62 and a nose pan assembly 64. The hood assembly 62 is movable to allow access to the engine assembly 40 and its associated components.

Figures 3A, 3B:
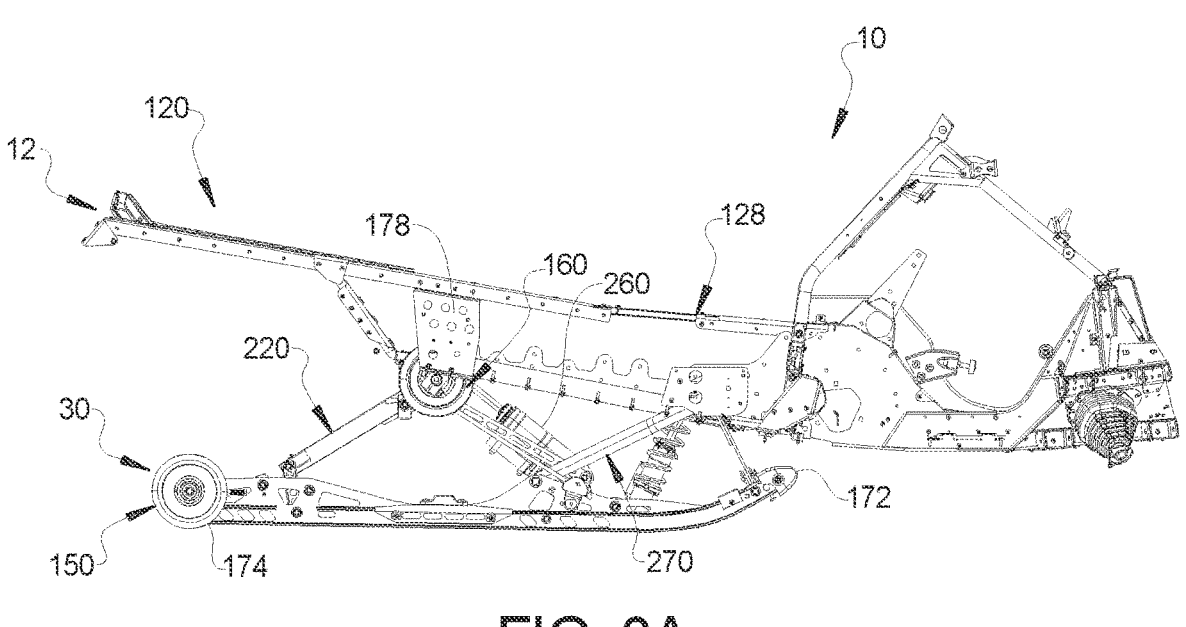
FIG. 3A is a right side detail view of the snowmobile with rear suspension in full extension.
FIG. 3B is a left side planned view of the snowmobile with rear suspension in full extension.
Figures 4, 5:
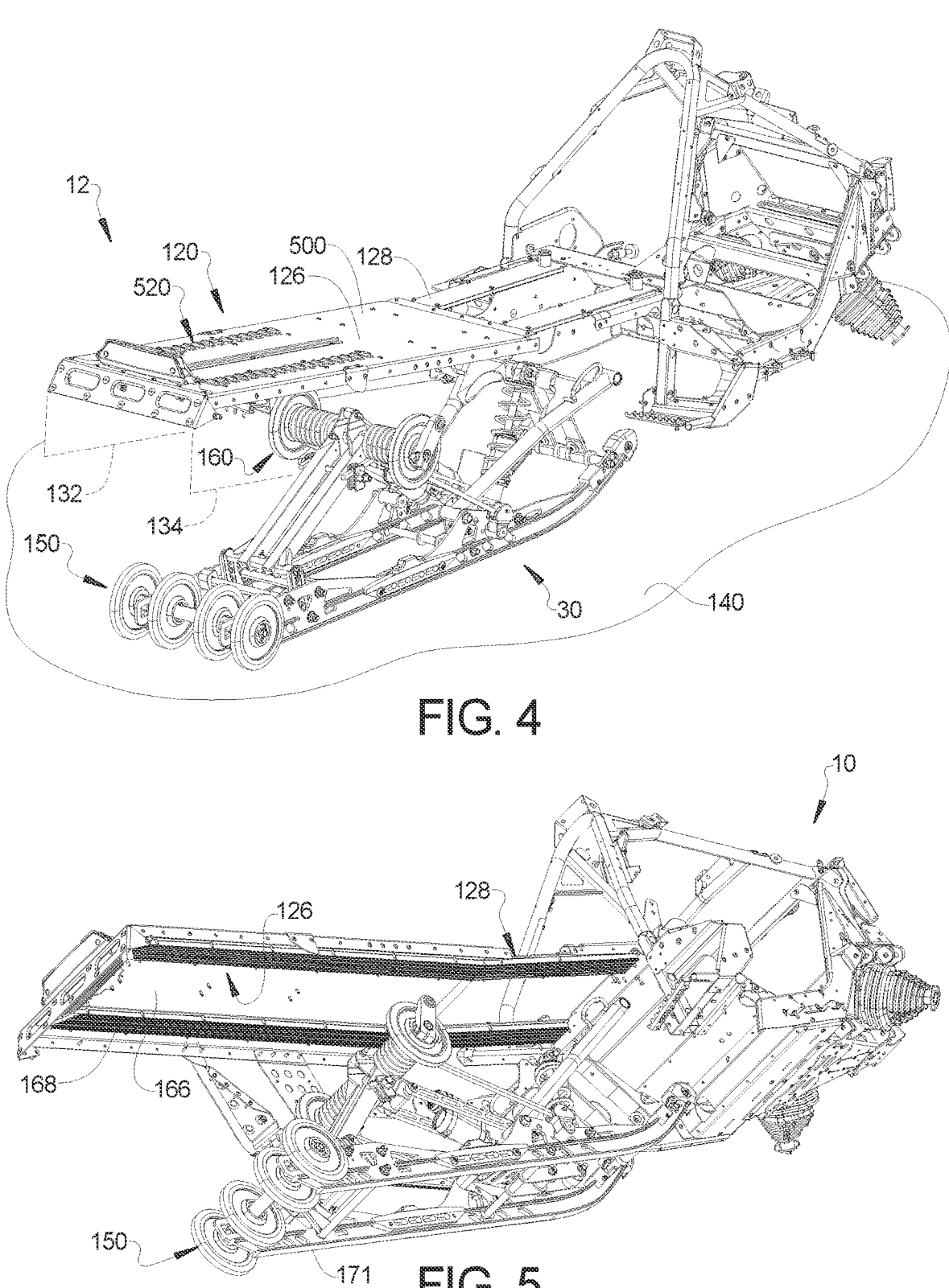
FIG. 4 is a rear perspective view of the snowmobile with rear suspension in full extension.
FIG. 5 is a bottom perspective view of the snowmobile with rear suspension in full extension.

As illustrated in FIG. 2A and FIG. 2B, the chassis assembly 12 may be positioned relative to the suspension assembly 30. In various embodiments, the suspension assembly 30 includes one or more linkage portions that are connected to the chassis assembly 12. For example, the chassis assembly 12 may include a tunnel portion 120, as illustrated in FIG. 3 and FIG. 4. The tunnel assembly 120 may include various portions such as a top or planar member portion 126 that is mounted or connected to a frame member or assembly 128. Further side walls, including a first side wall 132 and a second side wall 134 may also be connected to the frame assembly 128. Accordingly, the tunnel assembly 120 may generally include the top member 126 and the side walls 132, 134. The track 14, as illustrated in FIG. 1, may engage a surface, such as a ground or snow surface 140. As discussed above, the track 14 may be driven by the engine assembly 12 around one or more rollers or guide roller assemblies. For example, a rear guide roller assembly 150 may guide a rear most portion of the track 14 and an upper or top guide roller assembly 160 may guide the track 14 in apportion of its path. Accordingly, the track 14 may move around the suspension assembly 30 as driven by the motor 40 to move the snowmobile 10.

The track 14 may enter a pass through portion of the tunnel assembly 120 of the chassis assembly 12 as illustrated in FIG. 3 and FIG. 4. As discussed further herein, the cooling assembly 50 may include a radiator assembly or portion that may have a radiator portion or tubing 168 that extends near or relative to the top member 126, such as near a bottom surface 166 of the top member 126. The radiator assembly 168 may include one or more coils or tubes that carry a cooling fluid from within or near the engine assembly 12.

With continuing reference to FIG. 3A, FIG. 3B, FIG. 4, and FIG. 5, the snowmobile 10 includes the suspension assembly 30 that is connected to the frame 128 of the chassis assembly 12. The suspension assembly includes a lower skid or slide plate or runner assembly 170 on which the tread or track 14 may slide on a bottom surface 171 thereof when guided via the rotors 150, 160 and powered by the motor 12. The skid or slide member assembly 170 may include a right and left plate or member, and discussion herein to one skid plate is not intended to be limiting to a snowmobile with only a single skid plate. The skid plate 170 may extend from a first end 172 to a second end 174 to which the rotors 150 are movably connected. The first end 172 may be a front end and the second end 174 may be a back end, relative to an orientation of the snowmobile 10.

Figure 6A:
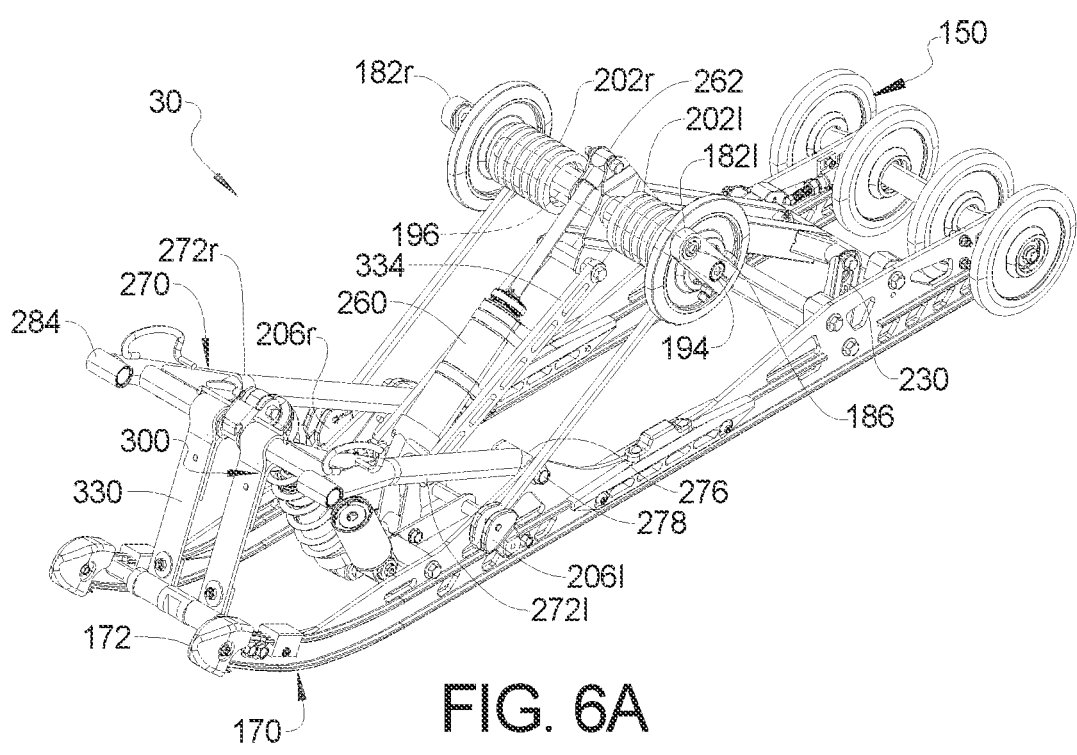
FIG. 6A-FIG. 6C is a detailed view of the rear suspension assembly in full extensions.
Figure 6B:
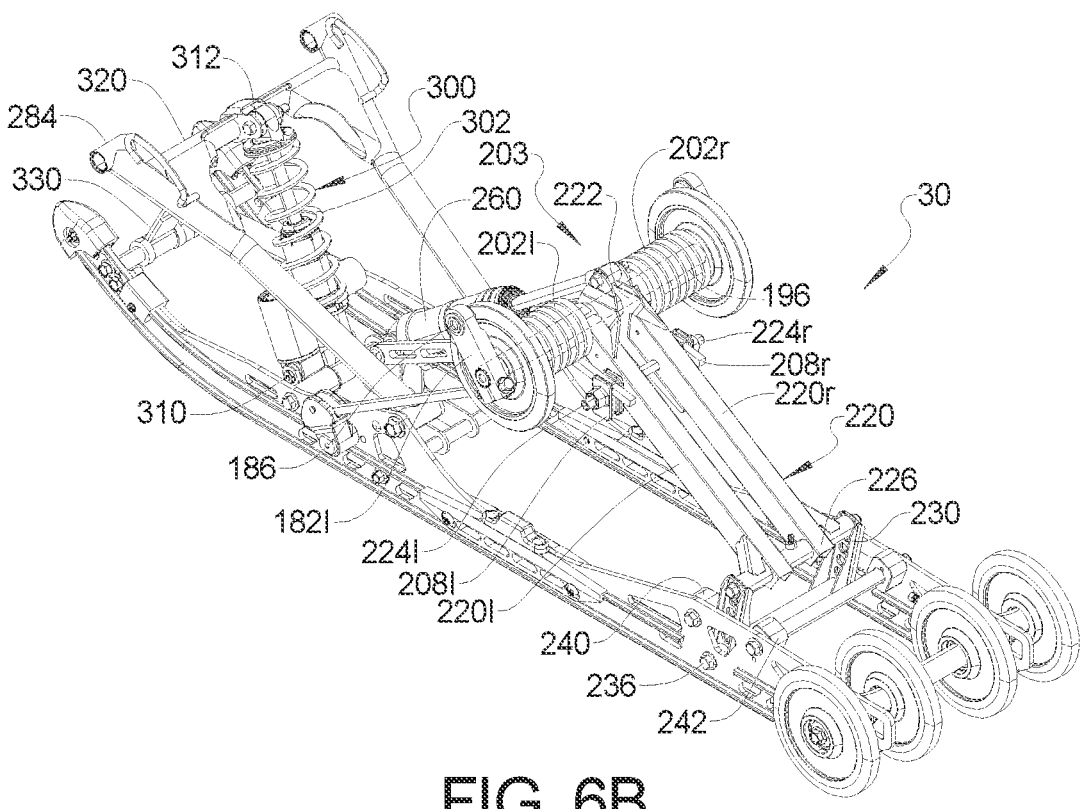

The skid plate or portions 170 are connected via various linkages of the suspension assembly 30 to the frame 128. The frame 128 may include various connection portions or members such as extension member or plate 178. The extension plate 178 may include one or more through bores to engage selected fasteners such as rivets, bolts, screws, and the like to interconnect an extension member or torque link member 182. As noted above, it is understood that various features may include a left and right version that may be substantially identical or mirrored portions of each other. Accordingly, the torque link 182 may include a right and left torque link 182*r* and 182*l*. The torque link 182, as illustrated in FIG. 6A and FIG. 6B, may include a through bore or passage 186 at a first end 188 of the torque link 182. The fastener may extend through the extension plate 178 and pass through the bore 186 to engage or hold the torque link 182 relative to the plate 178. The bore 186 may include one or more washers or bearings to allow for rotation of the torque link 182 relative to the plate 178 during movement of the suspension assembly 30, as discussed further herein.

At a second end of the torque link 182 may be another connection end or portion 194 to fixedly engage a rod or dowel that extends through the suspension assembly 30 and interconnects the left and right torque links 182*l*, 182*r*. Left and right torsion springs 202*r* and 202*l* may be positioned relative to the rod 196 and interact to bias the suspension assembly 30, including the skid plate 170, away from the chassis assembly 12. The torsion springs 202 are connected between a lower or forward torsion connection 206*l*, 206*r* at or near the skid plate portion 170 and at a second end at rear or second torsion spring connection points or blocks 208*l* and 208*r*.

Figure 6C:
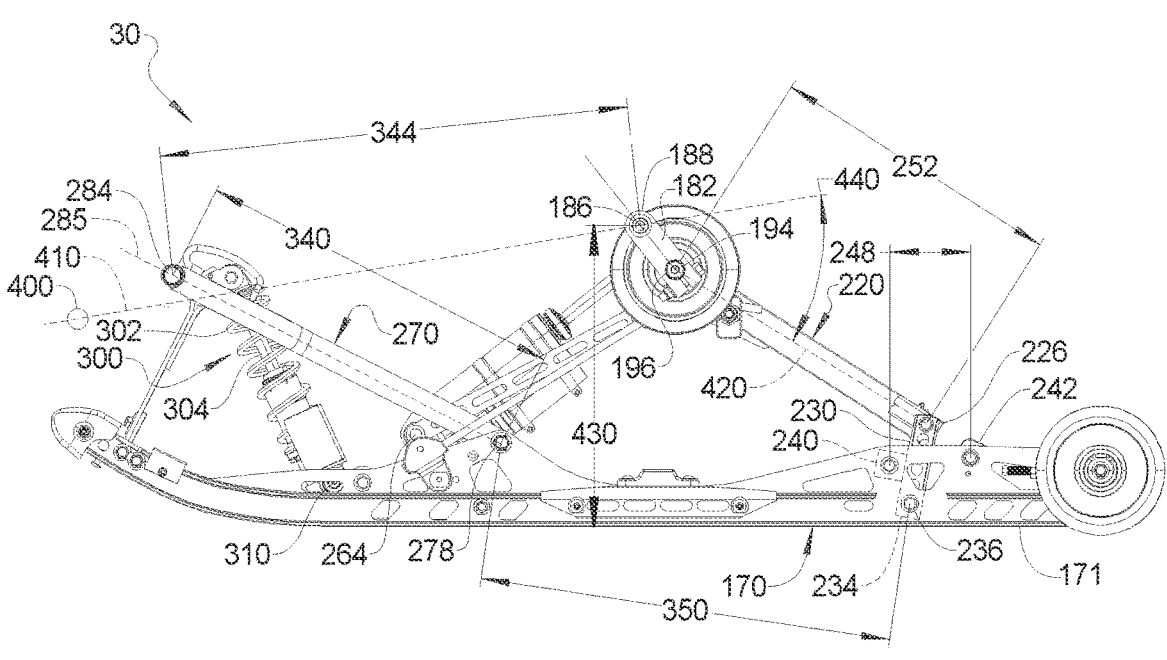

The torsion springs, therefore, may resist or bias the suspension assembly 30 into a full extension configuration as illustrated in FIG. 6A, FIG. 6B, and FIG. 6C. The rear or second torsion spring connection blocks 208*l* and 208*r* may be fixed to or incorporated into a rear torque arm (RTA) 220. The rear torque arm 220 may extend from a first end or forward end 222 at or near the rod 196 that extends through the torsion springs 202. The rear torque arm 220 may include connection points for the torsion spring fixation blocks 208*l* and 208*r* that may be held with fasteners 224*l* and 224*r*. The fasteners 224 may be any appropriate fasteners such as bolts, rivets, or the like. In various embodiments, the RTA 220 may also have formed integrally with the rear connection blocks 208*l* and 208*r*, such as with molding or forging, rear torsion holding points for the torsion springs 202.

The RTA 220 is connected to the rod 196 at a torsion spring assembly 203, including the springs 202 and the rod 196, and extends towards a rear of the suspension assembly 30 to a second end 226. The second end 226 is connected to a rear linkage or scissor linkage member 230. The scissor linkage 230 is connected to the rear or second end 226 of the RTA 220 with a selected fastener, such as a bolt, rivet, nut, or the like.

The scissor member 230 is rotatable connected to the skid plate member 170 at a second end or connection end 234 such as also with a rivet, bolt, nut, or the like as a connection fastener 236. As discussed further herein, movement of the scissor member 230 may be between a first or forward block member 240 and a rear or second block member 242. The block or stop members 240, 242 may be positioned relative to one another, such as a selected distance or amount of rotation around the fasten or connection portion 236. For example, the block or stop member 240, 242 may be separated by a distance 248. The distance 248 may be between center points of the block members 240, 242 and/or facing edges thereof. The distance 248 may be any appropriate distance, such as about 8 centimeters (cm) to about 11 cm, including about 9 cm to about 11 cm, and further including about 9.7 cm to about 10.1 cm.

During movement of the suspension assembly 30 relative to the chassis assembly 12, the RTA 220 may move and compress or provide a force or apply a force to the torsion springs 202. During movement of the suspension assembly 30 relative to the chassis assembly 12, however, the RTA may also cause the scissor linkage or arm 230 to move between the block or stops 240, 242. The amount of movement of the scissor arm 230 is therefore limited by the distance 248 between the stop portions or surfaces of the blocks 240, 242. Further, in various embodiments the blocks 240, 242 may be removed, including only one of the blocks such as the rearward block 242 or the forward block 240.

The RTA 220 may generally extend an RTA distance 252 between the two ends 220, 226. The distance 252 may be a length of the RTA 220 as defined by elongated RTA arms 220*l* and 220*r*. It is understood that the RTA 220 may include only a single arm or other appropriate configuration, but generally extends or holds the rod 196 of the torsion spring assembly 230 at the distance 252 from the connection points to the scissor arm 230. Accordingly, the distance 252 may also be referred to as the RTA distance 252 as discussed further herein.

With continuing reference to FIG. 6A, FIG. 6B, and FIG. 6C, the suspension assembly 30 may include further portions such as a first or rearward shock absorber 260 that interconnects the torsion spring assembly 203 and the skid plate portion 170 between a first connection end 262 and a second connection end 264. The rearward or first shock absorber 260 may assist in absorbing shock or a force of a movement of the suspension assembly 30 toward the chassis assembly 12. As discussed above, the torsion springs 202 of the torsion spring assembly 203 may assist in biasing the suspension assembly 30 away from the chassis assembly 12 to a full extension position as illustrated in FIGS. 6A-6C.

Forward of the torsion spring assembly 203 is a front torque or torsion arm assembly (FTA) 270. The front torsion arm assembly 270 may include left and right torsion arms 272*l* and 272*r*. As discussed relative to the RTA 220 the front torsion arm 270 may not include two or any appropriate number of arm members, accordingly, a left and right torsion arm is merely exemplary. The FTA 270 may be connected to an extension or frame portion of the skid plate 170 at a rear or first end 276 of the FTA 270 with a selected fastener 278 such as a bolt, nut, rivet, or the like. The fastener 278 may allow the FTA 270 to rotate or move relative to the skid plate 170, as discussed further herein.

The FTA 270 may extend from the first end 276 to a second end 284. The second end 284 may allow or define a second connection region or connection to the chassis assembly 12, as illustrated in FIGS. 3A and 3B. The FTA 270 at the second or forward end 284 connects to the frame 128 such as through an extension member or panel 290. The panel 290 may be an integral portion of the frame 128 and/or may be an additional reinforcement member, extension or connection member, or the like. Similarly, the panel 178 connecting to the torque link 182 may be integral with the frame 128, an extension thereof, or a reinforcement member thereof. Nevertheless, the connection of the second end 284 of the FTA 270 to the frame 128 may allow for rotation about the connection portion or region 284, such as with a fastener having a bearing or bushing associated therewith similar or identical to the connection of the RTA 220 to the scissor member 230 at the end 226. Accordingly, a selected fastener 294 may be any appropriate fastener such as a bolt, rivet, bearing assembly, or the like to connect the FTA 270 to the frame 128.

Connected to the FTA 270 may be a front or forward shock absorber 300. The shock absorber 300 may include a spring over shock absorber assembly where a spring 302 is positioned over the shock absorber 300 and generally engages near a piston rod 304 of the shock absorber 300. The shock absorber 300 may be connected to the skid plate assembly 170 at a first end 310 and to the FTA 270 at a second end 312. Accordingly, during movement of the FTA 270 the shock absorber 300 may assist in absorbing shock between the chassis assembly 12 and the suspension assembly 30. The spring 302 may bias the suspension assembly 30 away from the chassis assembly 12 similar to the torsion springs 202, as discussed above. The shock absorber 300 may be connected to a crossbar or cross member 320 between the two arms or a leg 272*l* and 272*r* of the FTA 270. Thus, movement of the FTA 270 may act on the shock absorber 300 and the spring 302 and similarly the biasing of the spring 302 may bias the FTA 270 relative to the skid plate or skid portion 170.

It is understood that various other portions may be interconnected in the suspension assembly 30 that are not specifically described here but generally allow for reinforcement of the suspension assembly 30 relative to the chassis assembly 12 and/or the skid plate or members 170 relative to each other and the various portions of the suspension assembly 30. For example, tension or enforcement straps 330 may interconnect the mounting region near the shock absorber 300 and a front or forward portion of the skid members 170. Further, reinforcement bars or linkages 334 may be positioned relative to the first shock absorber 260 to assist in reinforcing and maintaining a selected orientation of the shock absorber 260 relative to the skid plates 170 and the torsion spring assembly 203 relative to the skid plate assembly 170 and the shock absorber 260. It is understood that further other various specific linkages and members may be provided, as understood by one skilled in the art, which assist in operation of the suspension assembly 30, as discussed further herein.

The suspension assembly 30 may have further dimensions, as discussed above and herein. The FTA 270 may have a selected length 340 between the first end 276 and the second end 284, as illustrated in FIG. 6C. The length 340 may be an appropriate length, as discussed further herein, to assist in ensuring or allowing a selected travel of the suspension assembly 30 relative to the chassis assembly 12.

The link 182 connected to the chassis through bore 186 may also have a fixed length 344 relative to the end 284 of the FTA 270, thus the bore may also be referred to as a linkage or link bore connection 186. The length 344 may also be any appropriate length between the link bore connection 186 and the end 284 of the FTA 270 as discussed further herein. The length 344 may be a length that is a straight line between the connection points of the chassis assembly 12 for connection of the link 182 at the bore 186 and the end 284 relative to the chassis assembly 12. It is understood that the line defining the length 344 may or may not be parallel to a bottom surface 171 of the skid plate 170.

A length or distance 350 may be defined between the end 276, such as where the fastener 278 extends there through, of the FTA 270 to the connection or end 234 including where the fastener 236 passes through the skid plate 170 for the scissor arm 230. The length 350 may be any appropriate length, as discussed further herein. It is also understood that the length 350 may be a straight line between the end 276 and the end 234 or the respective fastener connections 278, 236 that may be parallel to the bottom surface 171 and/or may not be parallel to the bottom surface 171. Thus, the length 350 may be measured along a line that may be parallel or not parallel with the bottom surface 171 and may depend upon the configuration of the rear suspension assembly, including the FTA 270, RTA 220, and/or scissor arm 230.

Figure 7A:
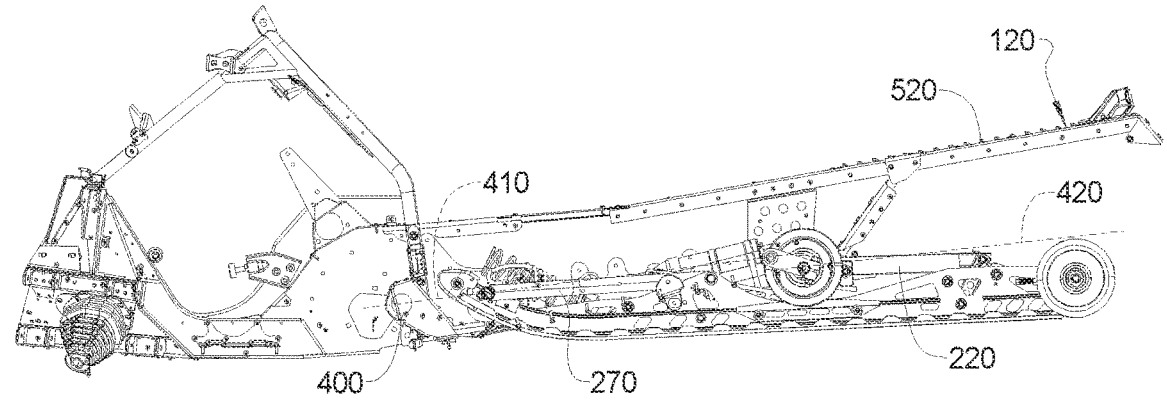
FIG. 7A is a left view of the snowmobile assembly and rear torque arm at center suspension compression.
Figure 7B:
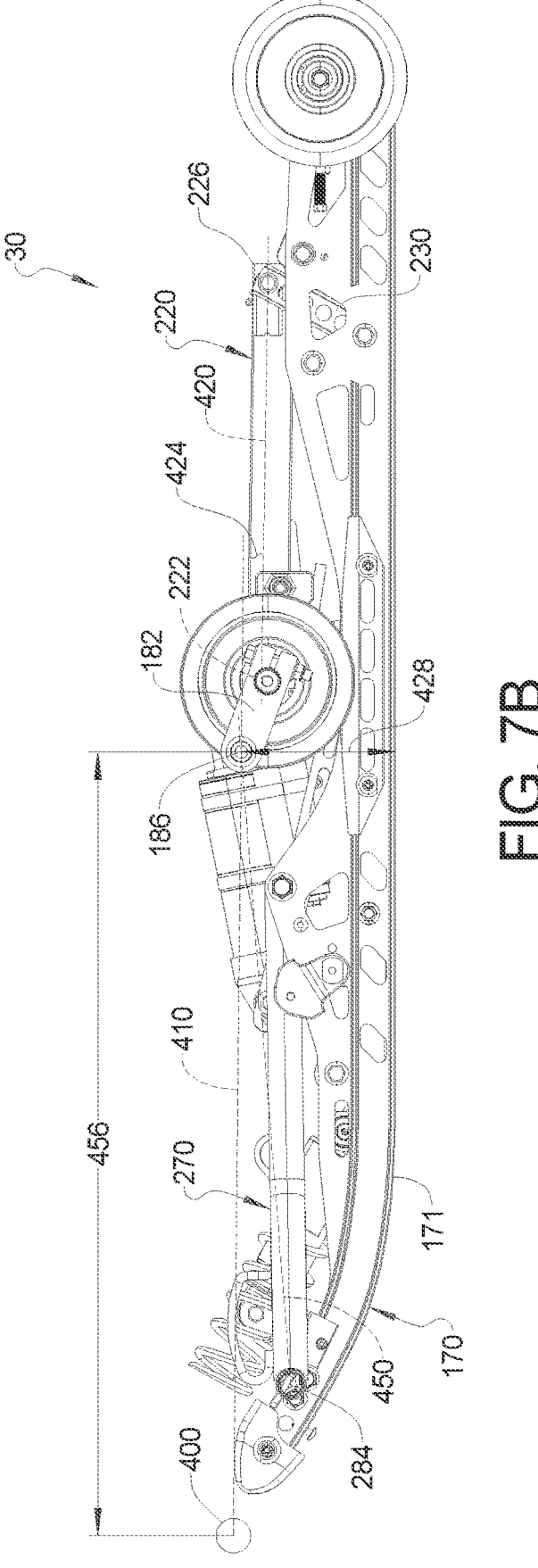
FIG. 7B is a detailed view of the rear suspension assembly and rear torque arm at center suspension compression.
Figure 8A:
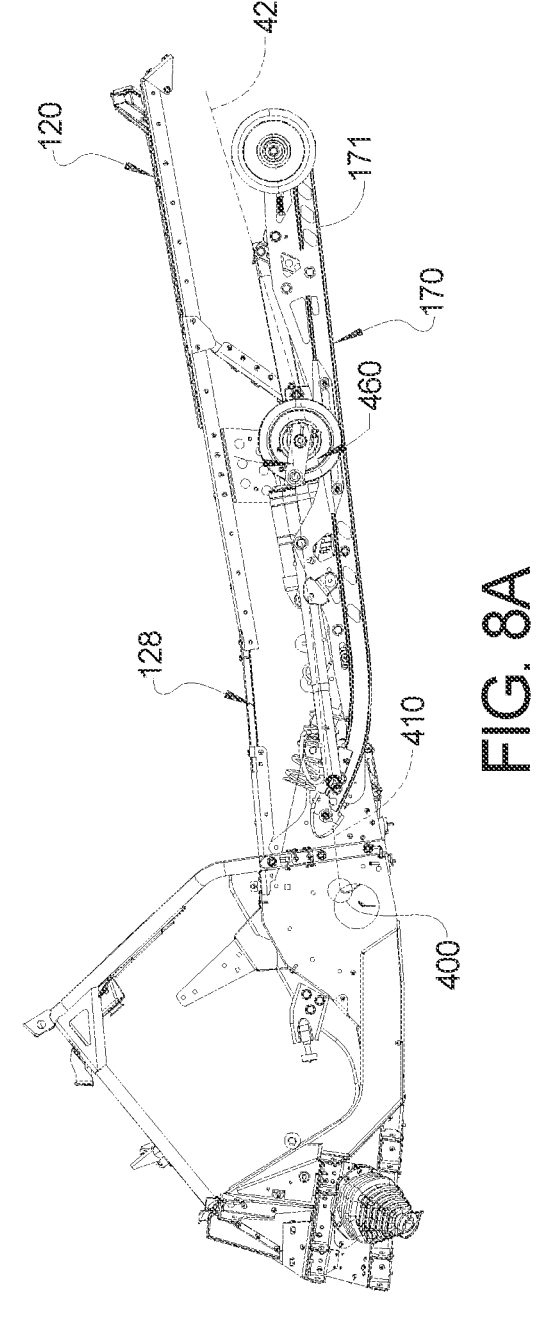
FIG. 8A is a left plan view of the snowmobile assembly and rear torque arm over center compression.
Figure 8B:
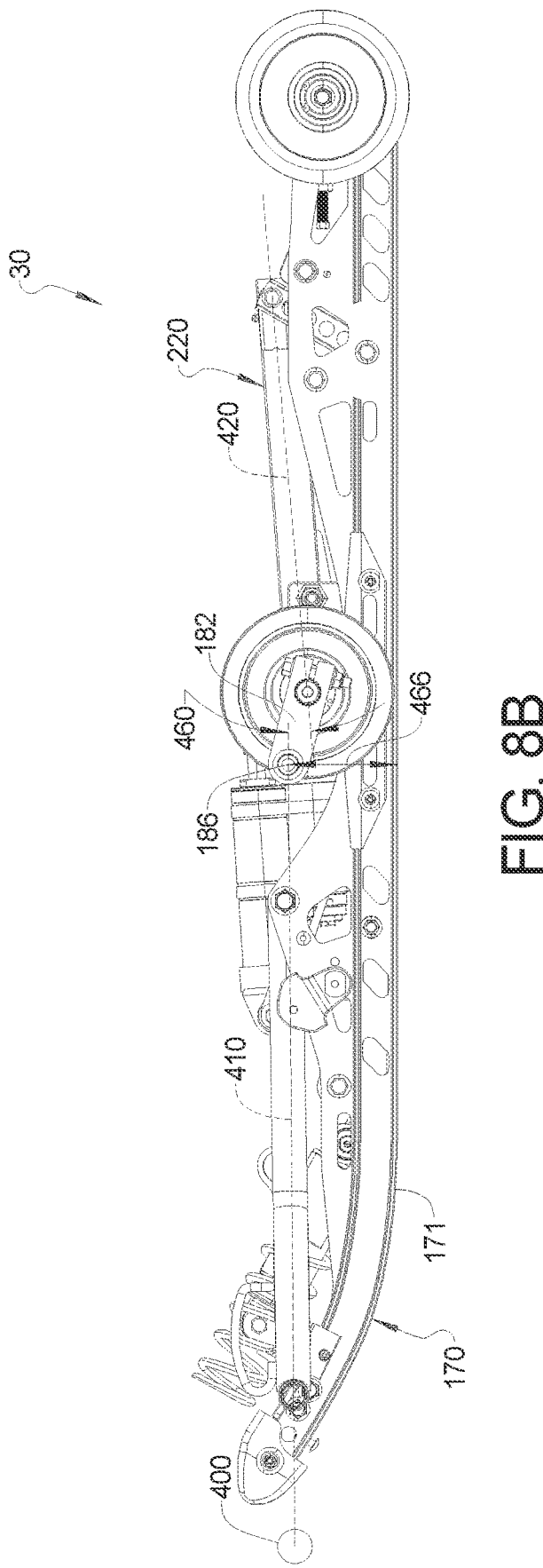
FIG. 8B is a detail view of the suspension assembly and rear torque arm over center suspension compression.
Figures 9A, 9B:
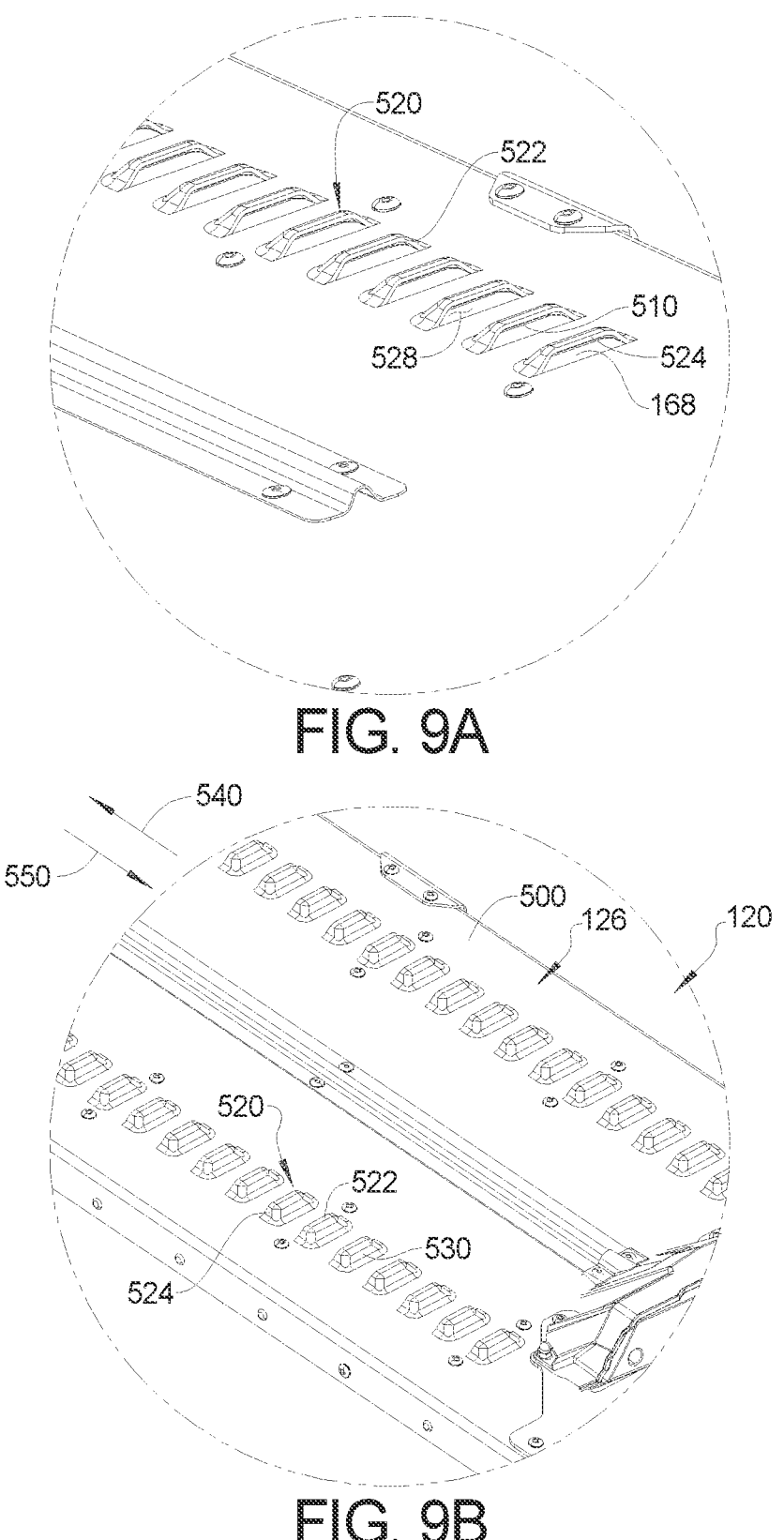
FIG. 9A is a detail view of the top surface of the tunnel member from back to front.
FIG. 9B is a detail view of the tunnel top member from front to back.

With continuing reference to FIG. 6A, FIG. 6B, and FIG. 6C and additional reference to FIG. 7A, FIG. 7B, FIG. 8A, and FIG. 8B, the snowmobile 10 including the chassis assembly 12 and the suspension assembly 30 relative thereto, is illustrated. As discussed above, the suspension assembly 30 and the chassis assembly 12 may move relative to one another. For example, during operation of the snowmobile 10 the surface along which the snowmobile 10 travels may be uneven. Accordingly, the suspension assembly 30 may move relative to the chassis assembly 12 to absorb shock and/or movement relative to the rider 11. Briefly, the suspension may be substantially un-collapsed or in full extension as illustrated in FIGS. 3A-6C. The suspension may move through a range of travel between full extension as illustrated in FIGS. 3A-6C to a full collapse as illustrated in FIGS. 8A and 8B. Between the full extension and the full collapse may be various other positions, such as a position where the RTA 220 is substantially flat or at the point before the RTA 220 extends past a line that extends between the bore 186 of the linkage 182 and a drive shaft connection 400 from the engine assembly 40. As is generally understood by one skilled in the art, the drive shaft connection 400 may be generally forward of the suspension assembly 30, including the skid plate 170. The drive shaft connection 400 may generally be within the chassis assembly 12 and near the engine assembly 40. However, a drive shaft line 410 may be drawn from the drive shaft connection 400 to the linkage connection 186. Further, a RTA line 440 may be defined through the RTA 220, such as between the end 226 that connects to the scissor assembly 230, to the opposite RTA end 226, which connects to the spring assembly 203. The line 420 may be defined between the two ends 220, 226 defined by the RTA 220. It is understood that the RTA 220 may further include a substantially straight assembly such that the line 420 is a long axis of the arms 220l and 220r of the RTA 220.

Generally, in the substantially flat configuration as illustrated in FIG. 7A and FIG. 7B, the drive shaft assembly line or forward line 410 is substantially parallel and/or in line with the RTA line 420. Accordingly, an angle 424, which may be referred to as a flat angle 424 may be generally or substantially 0. It is understood that in the flat configuration the flat angle 424 may be about 0 degrees such as about positive 1 degrees to about negative 1 degrees.

Further the linkage connection 186 may be a distance 428 relative to the bottom surface 171 of the skid plate 170. The distance 428 may be a distance of about 4 inches (in) to about 5 in (about 10 centimeters (cm) to about 13 cm), including about 4.5 in (about 11.4 cm). As illustrated in FIG. 6C, in full extension the connection or bore 186 may be a distance, such as referred to as an uncollapsed distance or full extension distance 430, relative to the bottom or skid surface 171 of the skid plate 170. The full extension distance 430 may be about 13 in (about 33 cm) to about 16 inches (about 41 cm), including about 14 in (about 35 cm) to about 15 in (about 38 cm), and further including about 14.8 inches (about 37.6 cm). Accordingly, the link connection 186 may travel about 8 in (20 cm) to about 12 (30 cm), including about 9 in (about 23 cm) to about 11 in (about 28 cm), and further including about 10.2 in (about 25.9 cm).

Further, as illustrated in FIG. 6A the length or distance 252 may be substantially equivalent or identical to the RTA line 420 illustrated in FIG. 6C. The RTA line 420 may have an angle 440 relative to the drive shaft line 410 of about 30 degrees to about 50 degrees, further including about 35 degrees to about 45 degrees, and further including about 39 degrees to about 40 degrees, and further including about 39.4 degrees. Accordingly, the angular travel from the substantially 0 or flat angle 424, as illustrated in FIG. 7B, to the full extension angle, as illustrated in FIG. 6C, may be about 30 to 50 degrees including about 39 to about 40 degrees, and further including about 39.4 degrees.

It is understood that the chassis assembly 12 is fixed to the suspension assembly 30 at various points or positions such that various dimensions between components of the suspension assembly 30 are unable to change. For example, the end 284 is connected to the chassis assembly 12 and the connection point or bore 186 of the linkage 182 is connected to the chassis assembly 12. As the dimensions of the chassis assembly 12 do not change substantially during operation, a distance 450 does not change during operation of the snowmobile 10 including movement of the suspension assembly 30 relative to the chassis assembly 12. Further a distance or length 456 between the drive shaft connection 400 and the linkage connection 186 does not change during operation of the snowmobile 10 including movement of the suspension assembly 30 relative to the chassis assembly 12. In various embodiments, the distance of length 450 may be about 20 inches to about 25 inches (about 50 cm to about 64 cm), including about 22 inches to about 24 inches (about 55 cm to about 61 cm), and further including about 23 inches (about 58.4 cm). Further the length 456, according to various embodiments, may be about 30 inches to about 40 inches (about 76 cm to about 102 cm), further including about 30 inches to about 34 inches (about 76 cm to about 87 cm cm), and further including about 32.5 inches (about 82.5 cm). Accordingly, the suspension assembly 30 may have distances and orientations that change, such as the distance of the linkage 186 to the bottom surface 171 and the angle between the RTA line 420 and the drive shaft line 410, during movement of the chassis 12 relative to the suspension assembly 30.

With specific reference to FIG. 8A and FIG. 8B, as noted above, illustrate the snowmobile 10 in a suspension configuration that is in a substantially fully collapsed orientation including a substantially maximum travel of the suspension assembly 30 relative to the chassis assembly 12. In the maximum collapsed orientation, there is a substantially minimum distance between the top member 126 of the tunnel member and the bottom surface 171 of the skid plate 170. In the fully collapsed configuration, as illustrated in FIG. 8A and FIG. 8B, the RTA line 420 of the RTA 220 may define a collapsed RTA angle also referred to as a negative RTA angle 460 relative to the drive shaft line 410. The negative RTA angle 460 may be about minus 3 degrees to about minus 5 degrees, further including about minus 3 degrees to about minus 4 degrees, and further including about minus 3.4 degrees. The negative angle of about 3.4 degrees allows that the angular travel of the RTA line 420 relative to the drive shaft line 410 from the full extension, as illustrated in FIG. 6C to the full compression, as illustrated in FIG. 8B, to be about 36 to about 46 degrees, further including about 39 degrees to about 44 degrees, and further including about 42.8 degrees.

The negative RTA angle 460 represents a distance or angle position of the RTA line 420 relative to the drive shaft line 410 that is below the substantially parallel or in line orientation as illustrated in FIG. 7A and FIG. 7B when the RTA flat angle 424 is produced. Accordingly, the suspension assembly 30 is able to travel a distance greater than a substantially flat or parallel orientation relative to the drive shaft line 410.

Further, in the full compression or full jounce position, a full compression distance 466 may be defined or formed between the connection bore 186 of the linkage 182 and the bottom surface 171 of the skid plate 170. The distance 466 may be about 2 inches to about 6 inches (about 5 cm to about 16 cm), further including about 3 inches to about 5 inches (about 7 to about 13 cm), and further including about 4 inches (about 10 cm). Accordingly, in the substantially full collapse position, the travel of the linkage connection 186 may be about 8 inches to about 12 inches (about 20 cm to about 31 cm), further including about 9 inches to about 11 inches (about 22 cm to about 28 cm) and further including about 10.8 inches (about 27.4 cm).

According to various embodiments the length of the track 14 may be a selected length, such as about 136 inches (about 345 cm). As discussed above, the distance 450 between the mount or connection of the FTA 270 at the end 284 and the connection of the RTA 220 at the linkage connection 186 to the chassis assembly 12 may be about 23.13 inches (about 58.75 cm). Thus the ratio of the length of the track 14 to the length 450 may be about 5 inches to about 6 inches (about 12.7 cm to about 15.2 cm), including about 5.8 to about 6 inches (about 14.7 cm to about 15.2 cm), and further including about 5.9 inches (about 15 cm). Further, the travel or distance configured to be moved by the linkage connection at the linkage connection portion 186 may be about 10.2 inches (about 25.9 cm). Thus, the angle from the fully extended angle to the flat angle 424 may be about 38 to about 42 degrees. The angular travel of the RTA 220 relative to the travel distance, such as the change in distance of length between the fully extended length 430 to the flat length 428 of the connection 186 to the bottom surface 171 of the skid plate 170 may be about 4 degrees to about 6 degrees per 1.0 inch (2.5 cm) of travel, including about 3.8 to about 4 degrees, and further including about 3.96 degrees per 1.0 inch (2.5 cm) of travel.

The geometry and configurations of the various portions of the suspension assembly 30 allow for the track length of about 136 inches while allowing for the long distance of travel of the suspension assembly 30 relative to the chassis assembly 12. As discussed above, for a track length of about 136 inches, a ratio of a track length to the distance 450 may about 5 to about 7, including about 5.5 to about 6.5, and further including about 5.8 to about 5.9, and further including about 5.11. Generally, the ratio may be based upon measurements in inches of the various lengths and distances. Also, the difference in the full extension distance 430 to the in-line or over center distance 428 may be about 10.24 inches (about 25.9 cm). The change in the distance of 10.24 inches results in an angle change between the RTA line 420 and the drive shaft line 410 per one inch of travel to about 3.96 degrees.

Further, the various portions of the suspension assembly 30 may include selected geometries and dimensions as well. As discussed above, the RTA 220 has an RTA length 252. Further the FTA 270 has an FTA length 340. Generally, the FTA length 340 is greater than the RTA length 252. It is understood, however, that the FTA length 340 may also be less than the RTA length 252. In various embodiments a selected suspension travel, as discussed above, may be achieved by the FTA length 340 being the same as the rear RTA length 252. Nevertheless, the FTA length is generally about 1.1 times to about 2 times, including about 1.2 to about 2.0 times, including about 1.2 times to about 1.3 times, and further including about 1.25 greater than the RTA length 252. Further, the FTA 270 may define or form a line 285 between the FTA ends 284 and 278. In the fully extended orientation, as illustrated in FIG. 6C, the FTA line 285 may not be parallel to the RTA line 420. Thus, the geometry defined by the FTA line 285 and the RTA line 420 may not define a parallelogram in the fully extended orientation, as illustrated in FIG. 6C.

With reference to FIG. 1, FIG. 2, FIG. 2B, and FIG. 9, the snowmobile assembly 10 including the chassis assembly 12 that forms or defines the tunnel region 120, as discussed above, may include various features to assist in cooling or removing the thermal energy from the engine assembly 40. The engine assembly 40 may include a liquid cooling system where fluid from the liquid cooling system may pass through one or more cooling tubes or regions 168. As illustrated in FIG. 5, the radiator assembly includes the radiator coils 168 that are positioned adjacent to the bottom surface 166 of the top member 126. The top member 126 of the tunnel portion 120 may have an upper surface 500. The upper surface 500 may be opposite the bottom surface 166. However, the top member 126 may be substantially a single member, such as a single piece of sheet metal formed as a top member 126. Therefore, the bottom surface 166 and the top surface 500 are substantially unitary relative to one another.

In various embodiments, the radiator coils or tubes 168 may be in contact with the bottom surface 166, and thus have a spacing distance from the surface 166 of about zero mm and generally adhered to (e.g. with brazing). It is understood, however, that the coils 168 may also be spaced a selected distance (such as about 0.5 cm to about 5 cm) from the bottom surface 166. In various embodiments, the coils 168 may be mounted to a first heat conductive member (e.g. a copped plate) and the conductive member is mounted to the bottom surface 166. This configuration may make assembly more efficient and rigid. The radiator tubes 168, however, are generally adjacent to the bottom surface 166. In various embodiments the radiator tubes or members 168 may be adhered to the bottom surface 166 such as with brazing, welding, selected thermal transfer adhesive, and the like.

Formed through the top member 126, however, may be one or a plurality of holes or bores 510. The hole 510 may allow access directly to the coils 168 through the top member 126 from the top or upper surface 500. For example, a cooling material, such as a fluid, may be passed through the hole or opening 510 to substantially contact and surround the radiator tubes 168.

Near or adjacent to the hole 510 may be one or more scoops or hoods 520. The hood 520 may include a top surface 522 and a side surface 524 that extends substantially from a top surface 500. Further a back wall 530 may extend between respective sides 524 and a system suspending and reinforcing the top 522. The hood or scoop 520 may form or have an open front portion 528 that is defined by the top 522 and the sides 524.

The hood 520, therefore, forms the opening 528 substantially in a single direction, which may toward the direction of travel of the snowmobile 10 during operation, or normal operation including forward motion of the snowmobile 10. The hood or scoop 520 may assist in directing or driving a selected material through the hole 510 in the top surface 500 of the top member 126. In directing or driving fluid through the hole 510, the hood 520 may assist in efficient cooling or contact of a cooling fluid with the radiator tubes or fins 168. Thus, during operation of the snowmobile 10, the engine 40 may be more efficiently cooled by having a supply of a cooling fluid being directed by the hood or scoop 520 through the hole 510 in the top member 126.

The direction of the opening 528 formed or defined by the scoop 520 may assist in driving or holding material toward the back 530 of the scoop as the snowmobile 10 moves in a generally forward direction, such in the direction of arrow 540. While moving in the direction of arrow 540, the hood 520 assists in causing any liquid or cooling fluid to move in an opposite direction, due to the laws of motion, such as generally the direction of 550. In various embodiments, for example, a cooling fluid or material, such as snow or ice, may be positioned on the top member 126. In further various embodiments, snow or ice may be packed into the scoops 520 and packed on top thereof. Accordingly, during operation of the snowmobile 10 the snow or ice may be moved or drive into the scoop 520 and directed by the top 522, sides 524, and back 530 toward the hole 510 and the top member 126. By driving or forcing the fluid or material through the hole 510 the cooling fluid or material would be passed near or onto the radiator coil or tubes 168.

It is understood that scoop 520 may be formed in a selected geometry to assist in directing the cooling fluid through the opening or hole 510. The opening 528 of the scoop 520 may be substantially oval, square, octagonal, or the like. Further, it is understood, that the scoop 520 may be defined by a half or some portion of a selected shape such as a circle, oval, octagon or hexagon, or the like. The sides 524 and back 530 may also be selectively shaped to assist in directing the cooling fluid toward the hole 510, such as narrowing or tapering from a side nearest to the opening 520 to an area nearest to the back 530 to increase a pressure of flow of the cooling material through the scoop 520 into the hole 510. It is understood that the cooling material may be any appropriate selected material such as water, ice, snow, a more chemically complex coolant, or the like.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A snowmobile assembly, comprising:
a chassis assembly having a tunnel assembly with a tunnel covering member;
a skid plate assembly having a skid plate surface;
a track having a skid surface configured to contact the skid plate assembly;
an engine housed at least partially within the chassis assembly configured to drive the track;
a suspension assembly configured to connect the chassis and the skid plate assembly in a moveable manner;
a plurality of through passages extending through the tunnel covering member; and
a plurality of hood members extending from a surface of the tunnel covering member.

2. The snowmobile assembly of claim 1, wherein the plurality of hood members form a plurality of openings over the surface of the tunnel covering member.

3. The snowmobile assembly of claim 2, wherein the plurality of openings are oriented in a single direction.

4. The snowmobile assembly of claim 1, further comprising:
a radiator configured to assist in dissipating heat from the engine, wherein the plurality of through passages are near to at least a portion of the radiator.

5. The snowmobile assembly of claim 4, wherein each hood member of the plurality of hood members form an internal shape positioned to direct a material through each through passage of the plurality of through passages.

6. The snowmobile assembly of claim 1, wherein at least one hood member of the plurality of hood members is positioned adjacent to one through passage of the plurality of through passages.

7. The snowmobile assembly of claim 1, wherein the plurality of hood members are integral and formed as one piece with the tunnel covering member.

8. The snowmobile assembly of claim 1, wherein the suspension assembly includes:
a first torque arm extending from a first end to a second end and a second torque arm extending from a third end to a fourth end;
wherein the first end is fixed to the chassis assembly at a first fixation point such that the first torque arm is operable to rotate about the first fixation point;
wherein the third end is fixed to the chassis assembly at a second fixation point such that the second torque arm is operable to rotate about the second fixation point; and

wherein the skid plate surface is operable to travel at least 20 centimeters from a full extension to a full collapse position relative to the second fixation point.

* * * * *